INVENTOR:
CHALMERS A. STRAYER

Oct. 7, 1952          C. A. STRAYER          2,612,872
HYDRAULIC COUPLING VALVE
Filed Oct. 25, 1949                                 2 SHEETS—SHEET 2

INVENTOR:
CHALMERS A. STRAYER
BY Herbert E. Metcalf
ATTORNEY

Patented Oct. 7, 1952

2,612,872

UNITED STATES PATENT OFFICE 2,612,872

HYDRAULIC COUPLING VALVE

Chalmers A. Strayer, Wilmington, Calif., assignor to Northrop Aircraft, Inc., Hawthorne, Calif., a corporation of California Application October 25, 1949, Serial No. 123,375

7 Claims. (Cl. 121—46.5)

This invention relates to hydraulic valves, and more particularly, to a simplified means for metering fluid through a hydraulic control valve which employs a lapped sleeve and spool assembly inserted into a housing.

In the type of hydraulic valve mentioned above, a slidable spool member is provided within a fixed cylindrical sleeve. This assembly is inserted in a valve housing which carries the desired exterior port connections. The housing provides fluid passages between the ports and openings through the sleeve, and the spool is provided with various grooves and passages which change the flow path as desired when the spool is moved axially by means of its protruding ends. This construction is very desirable for use in airplane surface control systems where accurate metering of fluid to and from an actuating cylinder is desired, to give rate response as well as direction, and the valve of the present invention is particularly designed in accordance with the requirements of an aircraft control system wherein an attitude control surface is moved under full power in response to signals from the pilot. Its use is not limited to this one field, however.

To obtain the desired metering of fluid through the valve, staggered patterns of circumferential flow holes are progressively uncovered as the spool is moved from neutral, thus controlling the volume of the fluid passages in accordance with definite positions of the spool. A valve of this nature is shown, described, and claimed in the copending application of Parker, Serial No. 17,624, filed March 29, 1948.

An object of the present invention is to provide a four-way metering valve of the sliding spool and sleeve type wherein the number of flow hole patterns is reduced to a minimum. Another object is to provide a valve in which substantially no axial forces on the spool are built up from reactions of the moving fluid. Still another object of this invention is to provide a valve of the type described in which the spool and sleeve do not require intricate and costly machining operations to achieve the desired results, and therefore to decrease manufacturing time and cost and increase serviceability.

Briefly, the invention comprises a four-way valve having only two flow hole patterns, these being located in the valve sleeve and spaced in a manner that will meter fluid to and from the valve outlets at the desired rate. The valve spool has two lapped metering lands which block off the flow holes in the sleeve as required and control the portion of the hole pattern that is opened to flow of fluid. Each end of the spool has a balancing land which directs fluid into a center passageway of the spool to prevent reactions of the moving fluid from building up axial forces on the spool, and which provides bearing area for the spool.

My invention will be more fully understood by reference to the following description relating to the accompanying drawings in which.

Figure 1:
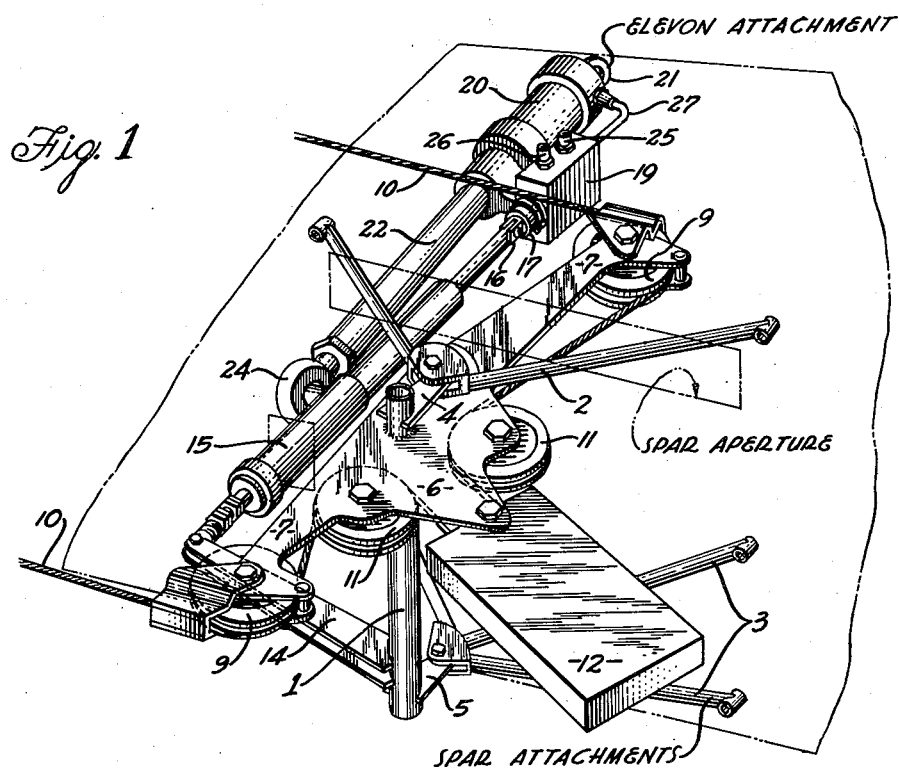
Figure 1 is a perspective view of the valve of the present invention connected for full power operation of an airplane attitude control surface.

Referring first to Figure 1, which shows an actual installation of a hydraulic cylinder and valve as used to operate an elevon (combination elevator and aileron on an all-wing airplane), a vertical axle 1 is placed within a wing panel, for example, and pivoted to wing spar attachments 2 and 3 at each end thereof respectively, by short bell crank arms 4 and 5 respectively. Above, axle 1 carries a pulley plate 6 extended to cross arms 7 carrying end pulleys 9 over which run control cables 10 to be operated by the pilot from a control column or stick as may be utilized. Cables 10 pass around tension box pulleys 11 to enter a cable tensioning box 12 attached to the pulley plate 6 as is well known in the art. Rotation of axle 1 by the pilot moves long bell crank arm 14 which is attached to a spring-loaded valve operating rod 15 passing through an aperture in the wing spar to link with a valve attachment 16. The spring load in rod 15 is such that the rod will extend or contract to protect the attached valve if manned by the pilot with no hydraulic pressure available to cause the surface to follow up the control column movement, for example.

Valve attachment 16 enters a valve assembly 17 inserted in a housing 19 securely fastened to a hydraulic actuating cylinder 20, the closed end of cylinder 20 being pivotally connected to an elevon operating arm (not shown) by elevon attachment 21. A piston rod 22 enters cylinder 20 opposite elevon attachment 21 and is pivotally connected to a wing point by wing attachment fitting 24. Piston rod 22 is, as is customary, attached to an actuating piston (not shown) operating in cylinder 20.

Valve housing 19 is provided with a hydraulic fluid pressure inlet 25 and a fluid return port 26. The piston rod end of cylinder 20 is supplied with fluid through a passage in the housing, and the closed end of the cylinder is supplied through the housing and through outside line 27.

In operation, it will be noted that as the cylinder is attached to the elevon operating arm and the piston rod to the wing, and the valve housing is attached to the cylinder, with the valve operating rod 15 coming from the wing, no additional mechanical follow-up link is needed. With the valve operating rod in neutral position, the elevon is held in position. When the valve operating rod is moved by pilot, fluid is admitted to one or the other sides of the piston in the cylinder, with the opposite side of the piston open to the fluid return. The cylinder then moves in accordance with the pressure application and the elevon moves. As it moves, however, the valve also moves since it is attached to the cylinder. When the neutral point within the valve is reached, the elevon movement stops. Thus the cylinder, and consequently the elevon, will follow all pilot-initiated movements of the valve operating rod 15. The extremely short feedback circuit created by the attachment of the valve to the cylinder with the cylinder moving with the elevon effectively prevents hunting. This type of operating connection, however, is not part of the present invention, it being described and claimed in a copending application, Serial No. 23,567, filed April 27, 1948.

In the full power system described above, it has been found that its successful operation depends to a large extent on the action of the control valve. One form of improved valve which gives fully satisfactory system operating characteristics will be described next.

Figure 2:
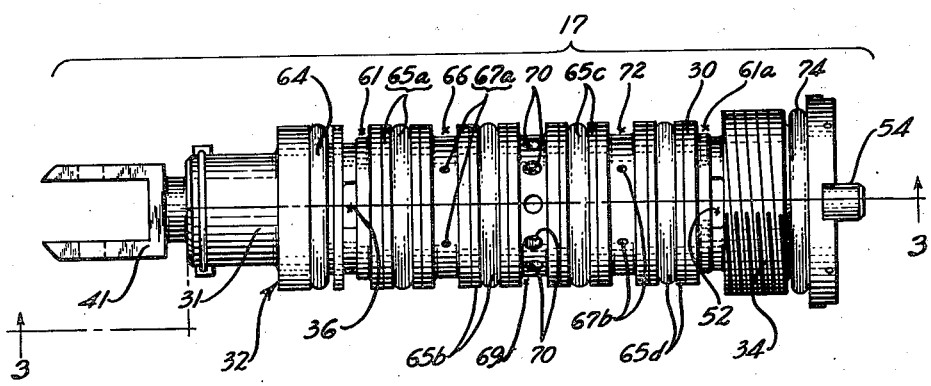
Figure 2 is an elevation view of the valve assembly used in the system shown in Figure 1, showing a preferred embodiment of the valve.
Figure 3:
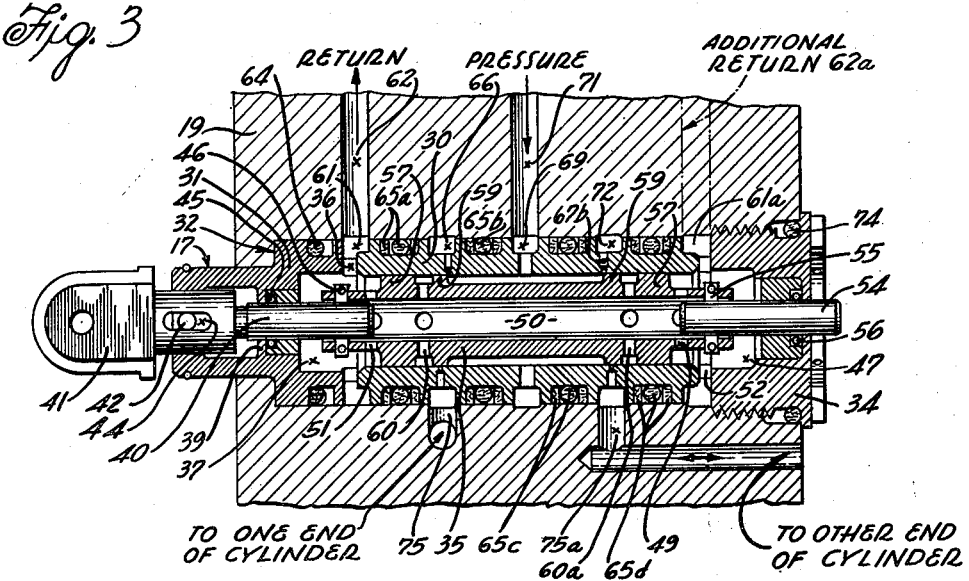
Figure 3 is a longitudinal section view taken as indicated by the line 3—3 in Figure 2, showing internal construction of the valve, and with a portion of the valve housing added.

As shown in Figures 2 and 3, the valve assembly 17, one end of which protrudes from the valve housing 19 in Figure 1, comprises a valve sleeve 30 secured in valve housing 19 between an end assembly 31 having a retaining shoulder 32, and a threaded plug 34, and a valve spool 35 slidably fitting within the sleeve 30 and movable by valve operating rod 15 through the valve attachment 16.

The inner terminus of end assembly 31 is provided with opposed end assembly ports 36 entering a return chamber 37 which is separated from the outside by a partition 39 in the end assembly 31 bored out to pass a spool rod 40 attached outside of partition 39 to a clevis 41 in turn connected to valve operating rod 15. The clevis 41 is held to a fixed travel by a clevis pin 42 attached to end assembly 31 and passes through an elongated hole 44 in the clevis 41. A spool rod packing 45 is installed in partition 39 to prevent external leakage. Spool rod 40 is attached by a spool pin 46 to the valve spool 35 sliding inside of valve sleeve 30. Spool pin 46 is in line with end assembly ports 36 for easy assembly.

The threaded plug 34 at the right end of the valve assembly 17 is provided with a threaded end return fluid chamber 47 connecting with clevis end return chamber 37 by threaded end ports 49 in the spool 35 through a central spool bore 50 and clevis end ports 51. These ports 51 communicate directly with clevis end return chamber 37 and end assembly ports 36. The threaded plug 34 is also provided with opposed plug ports 52 which may be connected to an outside return passage as will be discussed later.

Both ends of spool 35 are exactly alike, the spool being attached at the threaded end to a spool idler rod 54 by idler pin 55. Idler rod 54 passes through the threaded plug 34 and is sealed by idler rod packing 56 mounted in the plug.

The exterior of the cylindrical valve spool 35, as shown in Figure 3, carries two balancing lands 57 located one near each end just adjacent the threaded end ports 49 and the clevis end ports 51, respectively, and toward the center of the spool therefrom. A metering land 59 follows each balancing land 57 on the inward side thereof. Between each metering land 59 and its adjacent balancing land 57 is provided a ring of spool return passages 60 or 60a which connect with the central spool bore 50. The diameter of the spool 35 at all spool lands is the same, this being lapped carefully to match the inner diameter of the sleeve 30, which is perfectly straight without grooves or projections.

Figure 4:
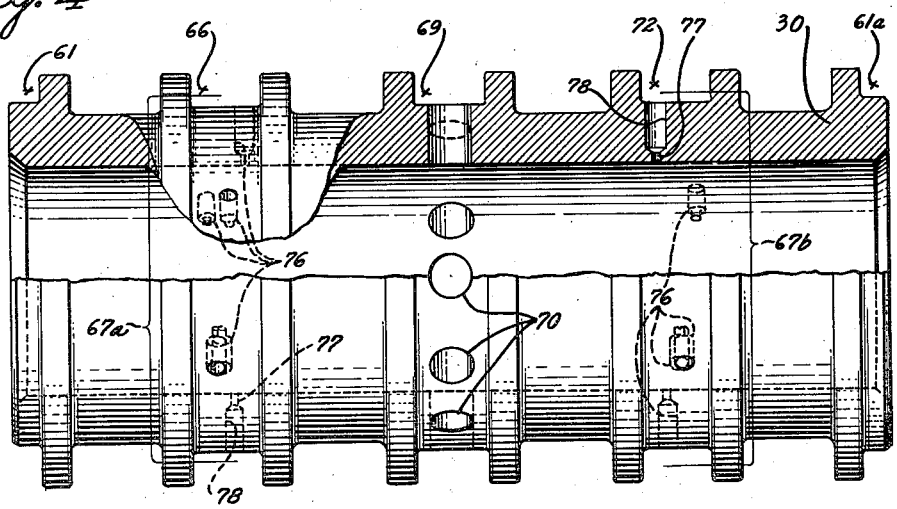
Figure 4 is an enlarged elevation view of the valve sleeve, partly in longitudinal section, showing the flow hole pattern therein.

On the outside of the valve sleeve 30, as shown in Figures 2, 3, and 4, at the left end thereof, is a peripheral return fluid groove 61, which, when the valve assembly is in place in the housing 19, communicates with fluid return port 26 through a housing return bore 62. An outer clevis end packing 64 seals return fluid groove 61 from the outside of the housing 19.

To the right of the fluid return groove 61 is an outer ring seal 65a separating the return fluid groove 61 from one cylinder groove 66 having a set of circumferential metering holes 67a therein communicating with the interior of the sleeve 30. These metering holes will be described in detail later. Another outer ring seal 65b follows on the sleeve, then an outer pressure fluid groove 69 communicating with the interior of the sleeve through pressure passages 70. The outer pressure fluid groove 69 connects with the pressure inlet 25 through a pressure bore 71 in the housing 19.

Next is still another ring seal 65c followed by a second cylinder groove 72 communicating with the interior of the sleeve by means of a second row of circumferential metering holes 67b. A fourth ring seal 65d follows. At the right end of the sleeve, identical to the left end, is an alternate return fluid groove 61a. Then comes the threaded plug 34 screwed firmly against the sleeve 30 and sealed from the outside by a threaded end ring seal 74.

In the housing 19 opposite each of the two cylinder grooves 66 and 72 is a cylinder bore 75 or 75a connecting respectively to opposite ends of the actuating cylinder, as mentioned before.

The general operation of the valve assembly 17 is now apparent. In Figure 3, the spool 35 is shown in neutral position. Fluid under pressure is present around the center of the spool between the metering lands 59. When the spool is pulled to the left, for example, by the valve operating rod 15, fluid is admitted at an increasing rate through the left set of metering holes 67a in the sleeve 30 to the first cylinder groove 66 and thence through its respective cylinder bore 75 to one end of the hydraulic elevon actuating cylinder 20 to move the enclosed piston and so operate the elevon. At the same time, fluid from the other end of the cylinder returns through the other cylinder bore 75a and the right set of metering holes 67b to the right end spool return passages 60a. Return fluid thus enters the central spool bore 50 and reaches the housing return bore 62 through the clevis end ports 51, end assembly ports 36, and return fluid groove 61 at the left end of the sleeve 30.

When the spool 35 is moved to the right side of neutral, flow is reversed through the two sets of metering holes 67a and 67b and cylinder bores 75 and 75a, and return fluid enters the central spool bore 50 through the left end spool return passages 60 to be returned through the housing return bore 62 again.

The detailed construction of the metering hole patterns in the sleeve will next be described. As best shown in Figure 4, each set of metering holes 67a and 67b comprises six flow holes 76 radially located through the sleeve 30 at evenly spaced distances around the circumference thereof. Each flow hole 76 consists of a small drilled portion 77 next to the interior of the sleeve and a counter drilled portion 78 facing the cylinder groove 66 or 72 in the exterior of the sleeve. The flow holes of each set are staggered in the lengthwise direction on the sleeve to provide a predetermined relationship between spool travel and change of flow rate. In each set all of the six holes are covered by the metering land 59 on the spool 35, when in neutral, except that the end holes of each set (the two holes of each pattern which are the farthest apart in that pattern, longitudinally of the sleeve) are preferably bisected by the opposite edges of the respective metering land so that a small neutral leakage to both sides of the actuating cylinder piston exists. That is, a neutral leakage, or small flow, occurs around one metering land 59 through two sleeve metering holes in one pattern and also around the other metering land 59 through two sleeve metering holes in the other pattern. In one preferred form, a pressure of 3000 p. s. i. is used in the pressure inlet 25 and the bisected flow holes are proportioned to provide a pressure drop of 1500 p. s. i. In consequence, there is in the neutral spool position, a preload of 1500 p. s. i. on both sides of the cylinder piston, thus preventing motion of the attached control surface under shock conditions. However, each hole pattern may be formed with end holes that are blocked, if desired, within the scope of the invention.

As a strong shearing action can take place between the valve sleeve and the spool at the flow holes 76, which will minimize the possibility of the spool jamming due to particles entering the holes, it is preferable to harden the spool and sleeve surfaces, as for example, to a hardness of Rockwell C-60 to C-65, and to use material having the same temperature coefficient to expansion to avoid binding between operating temperatures of from —65° F. to 165° F. for example. The provision of several flow holes, as described, also prevents a spool centering force from developing due to Venturi action at the port.

By making the metering lands 59 on the spool 35 just wide enough to cover the desired proportion of the hole pattern, and providing fluid pressure and return passages on opposite sides of each metering land, the same set of metering holes is used to meter the fluid away from the valve as well as back into the valve when the spool is moved through its travel. No idle flow patterns exist during flow of the fluid in either direction, and all the flow takes place through these flow holes. Since the hole location in each pattern is symmetrical about its center, a symmetrical fluid flow through the valve is obtained on each side of neutral, and there is no difference in response of the control column in either direction.

By directing return fluid into the central spool bore and then out through the sides of the spool, the reactions due to pressure of the moving fluid are balanced, and no resultant axial force is applied to the spool. This differs from the construction wherein fluid reacts between a portion of the spool on one side and a fixed housing portion on the other side of its turn in coming out of the valve.

In relatively large capacity control valves, a return passage for fluid may be provided at both ends of the spool. As shown in Figure 3, in dotted lines, an additional housing return bore 62a is provided opposite the return fluid groove 61a at the right end of the sleeve 30. Both housing return bores 62 and 62a may empty into the single return port 26. The original valve assembly 17, having a spool with identical ends and provisions for the flow of fluid past both ends of the sleeve, is adapted to be used in either case.

Thus it is seen that an improved metering valve is provided by the present invention. The metering holes are in the sleeve rather than in the spool, and a simpler construction results. While this valve has been described as being ideally adapted for use in a control system for aircraft surfaces, it will be obvious that the advantages of the invention as described herein can be put to many other uses. Such uses within the knowledge of those skilled in the art are deemed to be included in the scope of the appended claims.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute, the invention has been described in language more or less specific as to structural features, it is to be understood that the invention is not limited to the specific features shown, but that the means and construction herein disclosed comprise a preferred form of putting the invention into effect, and the invention is therefore claimed in any of its forms or modifications within the legitimate and valid scope of the appended claims.

What is claimed is:

1. A valve assembly comprising a hollow sleeve having a fluid pressure inlet therethrough, a fluid outlet, and two cylinder passages adapted to be connected, one with each side of a piston in a cylinder chamber, a spool member matching the interior of said sleeve and movable within said sleeve in either direction from a neutral position, each cylinder passage consisting of a plurality of metering holes through said sleeve around the periphery thereof and staggered lengthwise of said sleeve, said spool comprising two metering lands contacting the interior of said sleeve and spaced by the same distance as said two cylinder passages, said fluid inlet communicating with one side of each metering land and said fluid outlet communicating with the other side of each metering land, said neutral position of said spool occurring where each of said metering lands covers all of the metering holes in each cylinder passage except the two holes of each passage which are farthest apart from each other longitudinally of said sleeve, these latter four holes being substantially bisected by the edges of said metering lands.

2. In a hydraulic valve having a housing containing a fluid pressure inlet bore, a fluid outlet bore, and two cylinder bores adapted to be connected, one with each side of a piston in a cylinder chamber, a metering valve assembly comprising a hollow sleeve fixed in said housing, a pressure passage through said sleeve opposite said fluid inlet, a return passage through said sleeve opposite said fluid outlet, two cylinder passages through said sleeve respectively opposite said cylinder bores, a spool member matching the interior of said sleeve and movable within said sleeve in either direction from a neutral position, each cylinder passage consisting of a plurality of metering holes around the periphery of said sleeve and staggered lengthwise thereof in a symmetrical pattern about the center line of said passage, said spool comprising two metering lands contacting the interior of said sleeve and spaced by the same distance as said two cylinder passages, said pressure passage communicating with one side of each metering land and said return passage communicating with the other side of each metering land, said neutral position of said spool occurring where each of said lands covers all of the metering holes in the opposite metering passage except the two holes of each passage which are the farthest apart from each other longitudinally of said sleeve, these latter four holes being substantially bisected by the edges of the metering lands.

3. In a hydraulic valve having a sleeve and a spool movable axially in said sleeve to control hydraulic fluid flow, a metering land of predetermined axial length on said spool, and having the peripheral surface thereof in contact with the interior surface of said sleeve, said peripheral surface having two square-cornered edges, a plurality of metering holes through said sleeve around the periphery thereof staggered axially of said spool in a symmetrical pattern and opening inwardly through the inner surface of said sleeve to be entirely covered by the peripheral surface of said land except for a portion only of each of the two metering holes of said pattern which are farthest apart axially of said spool at the neutral position of said spool, each of said two holes having a portion opening into said sleeve on opposite sides of said metering land adjacent the respective edges thereof, a fluid flow port connected with the outer ends of all of said metering holes and fluid flow connections to each side of said metering land.

4. In a hydraulic valve having a sleeve and a spool movable axially in said sleeve to control hydraulic fluid flow, a pair of spaced metering lands each of predetermined axial length on said spool, and having the peripheral surfaces thereof in contact with the interior surface of said sleeve, a first plurality of metering holes through said sleeve around the periphery thereof staggered axially of said spool in a symmetrical pattern and opening inwardly through the inner surface of said sleeve to be entirely covered by the peripheral surface of one of said lands except for a portion only of each of the two metering holes of said pattern which are farthest apart axially of said spool at the neutral position of said spool, a second plurality of metering holes through said sleeve around the periphery thereof staggered axially of said spool in a symmetrical pattern and opening inwardly through the inner surface of said sleeve to be entirely covered by the peripheral surface of said second land except for a portion only of each of the two metering holes of said second pattern which are farthest apart axially of said spool at the neutral position of said spool, a first fluid flow port connected to the space between said lands, a second fluid flow port connected to said first plurality of flow holes, a third fluid flow port connected to said second plurality of flow holes, and a fourth fluid flow port connected to the space outside of each of said metering lands.

5. Apparatus in accordance with claim 1 wherein said spool has an axial bore, and radial spool passages conduct return fluid from said cylinder passages through said spool bore to said fluid outlet.

6. Apparatus in accordance with claim 1 wherein said spool has an axial bore in the center thereof, a balancing land beyond each metering land from the middle of said spool, said balancing lands also maintaining a sliding contact with the interior of said sleeve, a radial spool passage connecting the outside of said spool with said spool bore between each metering land and its respective balancing land and beyond each balancing land, the space between at least one end of said spool beyond the balancing land and said sleeve being open to said fluid outlet, whereby return fluid enters said spool bore and makes two substantially 90° turns in said spool to prevent fluid reactions from building up an axial force on said spool.

7. In a metering valve assembly, a hollow sleeve having a fluid pressure inlet therethrough, said fluid pressure inlet comprising a plurality of relatively large, radially and circumferentially aligned, holes through the wall of said sleeve, a fluid outlet from the interior of said sleeve around an end thereof, means defining two operating cylinder passages through said sleeve on opposite sides of said pressure inlet, each of said cylinder passage means consisting of a plurality of extremely small metering holes positioned radially through said sleeve around the periphery thereof and all staggered relative to each other lengthwise of said sleeve, a spool member matching the interior of said sleeve and movable within said sleeve in either direction from a neutral position, two metering lands on said spool contacting the interior of said sleeve and having the two outer edges thereof completely square-cornered, the spacing of the center lines of said lands equaling the spacing of the center lines of said cylinder passage means, said pressure inlet always communicating with one side of each metering land, and said fluid outlet always communicating with the other side of each metering land.

CHALMERS A. STRAYER.

REFERENCES CITED

The following references are of record in the file of this patent:

UNITED STATES PATENTS

| Number | Name | Date |
|---|---|---|
| 41,035 | Ball | Dec. 22, 1863 |
| 651,334 | Baker et al. | June 12, 1900 |
| 681,076 | Porter | Aug. 20, 1901 |
| 789,026 | Huston | May 2, 1905 |
| 2,503,870 | Harrington | Apr. 11, 1950 |

FOREIGN PATENTS

| Number | Country | Date |
|---|---|---|
| 212 | Great Britain | of 1895 |